United States Patent [19]
Hafner et al.

[11] Patent Number: 5,596,076
[45] Date of Patent: Jan. 21, 1997

[54] PROCESS FOR THE PREPARATION OF ELASTOMERIC POLYPROPYLENES

[75] Inventors: Norbert Hafner, Linz; Friedrich Mitter, Pasching; Hans Ledwinka, St. Ulrich; Elisabeth Bruckmüller, Weibern; Josef Kurz, Traun, all of Austria

[73] Assignee: PCD Polymere Gesellschaft m.b.H., Schwechat-Mannsworth, Austria

[21] Appl. No.: 246,291

[22] Filed: May 19, 1994

[30] Foreign Application Priority Data

May 21, 1993 [AT] Austria .................................. 994/93

[51] Int. Cl.$^6$ ...................................... C08F 6/24
[52] U.S. Cl. ........................... 528/483; 528/493
[58] Field of Search ...................... 528/483, 493

[56] References Cited

U.S. PATENT DOCUMENTS

| | | | |
|---|---|---|---|
| 3,454,545 | 7/1969 | Scoggin | 528/493 |
| 3,932,307 | 1/1976 | Setterquist | 252/430 |
| 4,211,863 | 7/1980 | McDaniel et al. | 528/483 |
| 4,335,225 | 6/1982 | Collette et al. | 526/351 |
| 5,232,993 | 8/1993 | Winter et al. | 525/268 |

FOREIGN PATENT DOCUMENTS

| | | |
|---|---|---|
| 1174857 | 3/1959 | France . |
| 54810 | 3/1967 | German Dem. Rep. . |
| 124527 | 3/1977 | German Dem. Rep. . |
| 285607 | 10/1983 | German Dem. Rep. . |
| 1093989 | 12/1960 | Germany . |
| 1495980 | 1/1972 | Germany . |
| 2046020 | 3/1972 | Germany . |
| 2522331 | 12/1975 | Germany . |
| 512212 | 4/1976 | U.S.S.R. . |
| 821118 | 9/1959 | United Kingdom . |
| 940178 | 12/1963 | United Kingdom . |
| 1105228 | 3/1968 | United Kingdom . |

OTHER PUBLICATIONS

Chemical Abstracts 85:33988m (1976).

*Primary Examiner*—Thomas R. Weber
*Attorney, Agent, or Firm*—Wenderoth, Lind & Ponack

[57] ABSTRACT

Process for the preparation of elastomeric, non-agglomerated, powdery/crumbly polypropylene by polymerization of propylene, if appropriate together with other olefins as comonomers, in liquid propylene and subsequent precipitation of the polypropylenes formed with $CO_2$ or a polar solvent of which the polar term "delta p" of the solubility parameter according to Hansen is greater than 5 and the total solubility parameter "delta" is less than 30.

6 Claims, No Drawings

PROCESS FOR THE PREPARATION OF ELASTOMERIC POLYPROPYLENES

The invention relates to a process for the preparation of elastomeric polypropylenes which are obtained in a non-agglomerated, powdery/crumbly form.

Polypropylene is a known material having a wide spectrum of uses. Crystalline polypropylene essentially has an isotactic or syndiotactic structure and has both good mechanical strength and chemical resistance. Amorphous polypropylene, which chiefly has an atactic structure, has only a low mechanical strength and is used, in particular, as an adhesive. Elastomeric polypropylenes such as are described, for example, in U.S. Pat. No. 4,335,225, U.S. Pat. No. 4,522,982 and U.S. Pat. No. 5,118,768 essentially have a stereoregular block arrangement in the chain build-up and comprise, for example, blocks of isotactic and atactic propylene sequences arranged alternately in the polymer chain. The incorporation of additional comonomers into the polymer chain is also possible. The elastomeric polypropylenes which, for example according to U.S. Pat. No. 4,335,225, contain an ether-soluble content of 10 to 80% by weight are distinguished above all by a high elasticity and good toughness and impact strength properties.

The elastomeric polypropylenes are prepared by conventional processes by polymerization of propylene and if appropriate comonomers in an organic reaction medium, such as, for example, hexane, cyclohexane or liquid or gaseous propylene. Special catalysts, for example those based on organometallic Ti, Zr or Hf compounds on an oxide support (U.S. Pat. No. 4,335,225), metallocene catalysts in combination with aluminoxanes (U.S. Pat. No. 4,522,982) or reaction products of magnesium alkoxides with a tetravalent titanium chloride in the presence of special electron donors (U.S. Pat. No. 5,118,768) are employed.

According to U.S. Pat. No. 4,335,225, if cyclohexane is used as the reaction medium, the polymerization mixture is worked up by precipitating the polypropylene by addition of acetone after the polymerization and then filtering it off. If liquid propylene is used as the reaction medium, the excess propylene is evaporated off after the polymerization, and the polypropylene which remains is swollen to a gel with cyclohexane and precipitated by addition of acetone. The disadvantage here lies above all in the use of a foreign solvent, that is to say cyclohexane, and in the additional working-up step thereby necessary for working up and separating the solvents. To avoid this disadvantage, according to U.S. Pat. No. 4,335,225 it is also possible to carry out the polymerization not in cyclohexane but in liquid propylene and to evaporate off the excess propylene after the polymerization. However, this results in the disadvantage that the resulting elastomeric polypropylene agglomerates very easily and is not free-flowing. Its further handling is thereby made difficult by the formation of lumps and by adhesion and sticking to components of the apparatus, stirrers, walls, transportation lines or storage tanks, there being the risk of blocking of the apparatuses. Furthermore, discharge of the polymer from the reactor is very difficult. It must sometimes be scratched or scraped out of the reactor mechanically. The agglomerates and lumps obtained by this method of working-up must then be comminuted by chopping, mincing or grinding in an additional working step.

The object of the invention was therefore to prepare elastomeric polypropylenes which do not have these disadvantages and in particular are in the form of non-agglomerated products which can easily be conveyed and metered.

It has been found, unexpectedly, that such elastomeric polypropylenes are obtained in a powdery/crumbly form if they are precipitated with special solvents or with $CO_2$ after a polymerization in liquid propylene.

The invention accordingly relates to a process for the preparation of elastomeric, non-agglomerated, powdery/crumbly polypropylenes by polymerization of propylene, if appropriate together with other olefins as comonomers, which is characterized in that liquid propylene is employed as the polymerization medium, and in that, after the polymerization, a polar solvent of which the polar term "delta p" of the solubility parameter according to Hansen is greater than 5 and the total solubility parameter "delta" is less than 30, or $CO_2$ is added to the polymerization mixture, whereupon the polypropylenes formed are precipitated and then isolated in the customary manner.

The polymerization is carried out by known processes, as described, for example, in U.S. Pat. No. 4,335,225, U.S. Pat. No. 4,522,982 or U.S. Pat. No. 5,118,768, usually at temperatures of about −60° to 175° C. under pressures of about 1 to 350 bar. Up to about 10 mol %, based on the total amount of the polymer, of other alpha-olefins, such as, for example, ethylene, 1-butene, 1-pentene, 4-methyl-1-pentene or 1-hexene, can be used as comonomers together with the propylene. The copolymers thereby obtained can be either random or block copolymers. Ethylene is the preferred comonomer.

The reaction product of an organometallic compound with a metal oxide, such as, for example, $Al_2O_3$, $TiO_2$, $SiO_2$ and MgO having a partly hydroxylated surface or mixtures thereof, for example, is used as the catalyst. The organometallic compounds have the formula $(RCH_2)_4M$, wherein M represents Ti, Zr or Hf, R represents aryl, aralkyl, tert-alkyl (for example trialkylmethyl) or trialkylsilyl and the $RCH_2$ group contains no hydrogen bonded to the carbon atom in the beta-position relative to M. The alkyl radicals mentioned can contain 1 to 12 C atoms. The two catalyst components are in general reacted in a ratio of about 0.01 to 1 mmol of the organometallic compound per gram of metal oxide. Catalysts which are prepared by reaction of organozirconium compounds $(RCH_2)_4Zr$, in particular tetraneophylzirconium, with hydroxylated aluminum oxide ($Al_2O_3$) in a ratio of about 0.1 to 1 mmol of organozirconium compound per gram of aluminum oxide are preferred. These catalysts and their preparation are described, for example, in U.S. Pat. No. 3,932,307 and U.S. Pat. No. 4,335,225, and, in the hydrogenated form thereof, in U.S. Pat. No. 3,950,269. Examples of organometallic compounds which may be mentioned are tetraneophylzirconium, tetraneopentylzirconium, tetrabenzyltitanium, tetrabenzylzirconium, tetraneopentylhafnium, tetrabenzylhafnium, tetrakis(trimethylsilylmethyl)zirconium, tetraneophyltitanium and tetraneopentyltitanium. The catalysts can also be prepared by reaction of the two components in the presence of propylene. Other possible catalysts are, for example, metallocene catalysts in combination with aluminoxanes, such as are described, for example, in U.S. Pat. No. 4,522,982, or the reaction products of a magnesium alkoxide with a tetravalent titanium chloride in the presence of electron donors, such as, for example, derivatives of veratrol, lutidine or similar structures, such as are described, for example, in U.S. Pat. No. 5,118,768. The catalysts can be introduced into the liquid propylene either as a powder or solution or as a suspension in a hydrocarbon, for example butane, pentane, hexane, cyclohexane, toluene or mineral oils.

The present invention is based on the surprising fact that the preparation of a non-tacky, crumbly/powdery to granule-like elastomeric polypropylene (PP) is achieved in a propene bulk process if, after the polymerization, a polar liquid of which the polar term of the solubility parameter "delta p" according to Hansen is greater than 5 and the total solubility parameter "delta" is less than 30 (Polymer Handbook 3rd edition VII/519–544, J-Brandrup, E. B. Immergut) is introduced into the polymerization mixture. Solvents having a "delta p" of greater than 8 are preferably used for precipitation of the elastomeric PP. If a solvent having a lower polar term of the solubility parameter than 5 is chosen, swelling of the precipitating PP particles in the slurry occurs, which promotes agglomeration of the polymer particles. If a solvent with too high a solubility parameter (delta greater than 30) is employed, an increased tendency to agglomerate likewise results from the inadequate wettability of the polymer. Suitable solvents are, for example, acetone, methanol, ethanol or ethyl acetate. Acetone, methanol or ethanol are particularly preferably used as the solvent for precipitation of the PP.

An amount of solvent such that the solvent-PP slurry which results after flashing of the excess propene remains free-flowing is advantageously used. If the amount of solvent employed is too low, there is an increased tendency to agglomerate during flashing of the propene and only a low flowability of the resulting slurry, especially in the case of solvents having a relatively low polar term of the solubility parameter. The amount of solvent employed is usually at least as high as the amount of the resulting elastomeric PP (ELPP).

It is furthermore preferable for the elastomeric PP to be precipitated by introduction of $CO_2$ into the polymer slurry after the polymerization. The solvents and the $CO_2$ can be employed either by themselves or as mixtures with one another.

When the polymerization has ended, the solvents and the $CO_2$ can be added either directly into the polymerization tank or after transfer of the polymerization mixture to a precipitating tank, and also, in the case of continuous polymerization, by continuous metering, for example in a downstream precipitating autoclave. It proves advantageous to add additives which may be desired, such as, for example, stabilizers, to the solvent. The resulting suspension flows readily and can easily be transported, pumped and then filtered or centrifuged. The temperature during the precipitation is usually about 20° to 90° C. It proves to be particularly advantageous if the slurry is stirred thoroughly during the precipitation of the PP.

With the process according to the invention, it is accordingly possible for the elastomeric polypropylene to be conveyed out of the reactor in a simple manner without agglomerating or sticking to components of the apparatus. Further working-up and isolation of the elastomeric polypropylene are carried out in the customary manner by flashing the excess propylene, separating off the polypropylene, for example by filtration or centrifugation, and then drying it.

According to Polymer Handbook 3rd edition VII, pages 540–544, the values of the solubility parameters "delta" and "delta p" of the solvents used in the following examples are:

|  | delta | delta p |
| --- | --- | --- |
| Acetone | 20.1 | 10.4 |
| Methanol | 29.7 | 12.3 |
| Ethanol | 26.6 | 8.8 |
| Ethyl acetate | 18.2 | 5.3 |

EXAMPLE A

Preparation of the catalyst used in the following examples:

44.22 g of a tetraneophylzirconium grey-brown in color (TNZ; Tm=66° C., Du Pont) were dissolved under an extra pure nitrogen atmosphere, at 20° C. in an inert gas-blanketed flask, in 620 ml of n-hexane, purified by means of a Cu catalyst (BASF catalyst R 3-11 at 70° C.) for removal of oxygen and a 4A or 10A molecular sieve for removal of water and polar impurities. After the majority of the insoluble residue had settled, the resulting suspension was filtered after 15 minutes over a glass frit into a stirred inert gas-blanketed glass flask (heated thoroughly at above 150° C. and flushed with extra pure nitrogen (less than 2 ppm of $O_2$) cooled to –40° C. After the filtration had ended (duration about 140 minutes), the flask was kept at –40° C. for a further 15 minutes, while stirring, in order to precipitate the TNZ as quantitatively as possible. After the TNZ had settled, the supernatant solution was filtered by means of a filter candle under an increased $N_2$ pressure into another cooled inert gas-blanketed flask. The TNZ which remained was dissolved in a further 350 ml of n-hexane at about 5°–10° C. in the course of 15 minutes and, after cooling to –34° C., precipitated again.

After the TNZ precipitate had settled, the solution was filtered again by means of an increased $N_2$ pressure through a glass filter candle into the cooled inert gas-blanketed flask with the first mother liquor. The TNZ was then dried via cold traps connected in series and cooled with liquid nitrogen by application of an oil pump vacuum (below $1\times10^{-2}$ mbar). The purified TNZ had a melting point of 68° C. and was white to cream-colored. The collected mother liquors were concentrated to about 200 ml and the still dissolved TNZ was precipitated by cooling to –40° C. After renewed pressure filtration through a filter candle, the TNZ was dissolved again in 100 ml of hexane, precipitated again at –40° C., filtered off and dried by means of vacuum as above. The total yield of this purification process was 82.2%. All the operations were carried out under extra pure nitrogen.

266.7 g of conditioned $Al_2O_3$ (Alumina C from DEGUSSA, conditioned at about 800°–1000° C. in a stream of $N_2$ and after storage at a relative atmospheric humidity of 50% and 23° C. for 16 hours and renewed drying to establish an optimal hydroxyl concentration on the surface of about 1 mmol/g of Alumina C at 400° C. in a stream of nitrogen) were weighed into a 6 l 4-necked inert gas-blanketed flask, and 5035 ml of n-hexane, purified by means of BASF catalyst R3-11 and a 4A or 10A molecular sieve, were added. The suspension was stirred at 300 revolutions/minute for about 1 hour. The 33.23 g of TNZ prepared above (without the product from the worked-up mother liquor) were then dissolved in 465 ml of n-hexane (purified as above) at 20° C. and this TNZ solution was initially added dropwise, with continuous stirring, to the $Al_2O_3$ suspension in the course of 50 minutes, a significant reduction in the viscosity of the suspension occurring after addition of a few ml of TNZ solution. After addition of the TNZ solution, the speed of rotation was reduced to about 120 revolutions/minute and the mixture was stirred for a further 12.5 hours with protection from light. To accelerate the filtration, the resulting catalyst solid was allowed to settle for 1 hour, and the solution was finally separated off by means of a pressure filtration over a glass frit (duration 3 hours). The catalyst solid was then dried to a constant weight of 292 g by application of a vacuum of below $1\times10^{-2}$ mbar (oil diffusion pump with two cold traps connected in series and cooled with liquid nitrogen), while stirring (duration about 5 hours). All the operations were carried out under extra pure nitrogen. The resulting $TNZ/Al_2O_3$ catalyst had a beige to pale brown coloration and was a free-flowing powder which had a tendency to form small beads of about 1 mm diameter.

EXAMPLE 1

After three propene/vacuum flushing cycles, a 20 l double-walled reactor which had been heated thoroughly at 160° C. under 0.1 mbar and had a surface-polished wall-flush stirrer, thermostatically controlled jacket and temperature, speed of rotation and torque measurement, was filled with 7.45 kg of propene at 25° C. After the stirrer had been raised to 400 revolutions/minute, 11.06 g of the neophylzirconium aluminate catalyst on an $Al_2O_3$ support (TNZ/$Al_2O_3$) according to Example A with a Zr content of 1.66% by weight and an $Al_2O_3$ content of 91.34% by weight were flushed in with 300 ml of liquid propene (about 20° C.), and the speed of rotation was reduced to 260 revolutions/minute after 2 minutes. The propene temperature was then increased to 60° C. in the course of 10 minutes and this temperature was maintained for 180 minutes from addition of the catalyst. The speed of rotation of the stirrer was then lowered to 200 revolutions/minute and 2500 g of acetone, preheated to about 50° C. were introduced into the reactor in the course of 3 minutes by means of an increased nitrogen pressure. After the speed of rotation of the stirrer had been increased to 400 revolutions/minute for 2 minutes, the reactor jacket was temperature-controlled at 40° C. and the propene which had not been consumed was flashed off at 55°–60° C. and 100 revolutions/minute in the course of 20 minutes. The ELPP(elastomeric PP)-acetone slurry which remained was readily stirrable and could be discharged without problems via the 1-inch bottom outlet of the reactor. To stabilize the ELPP, a corresponding Mount of Ionol® (Shell) and Irgafos® PEPQ (Ciba-Geigy) in a weight ratio of 2:1, which corresponded to about 0.3% by weight in the dried polymer, was added to the acetone slurry.

The reactor wall and stirrer were largely free from polymer. After filtration of the elastomeric polypropylene and drying in a stream of nitrogen at 50° C., 2.21 kg of a powdery/crumbly, non-tacky elastomeric polypropylene (ELPP) which was suitable for metering into processing machines and had a Zr content of 83 ppm and an $Al_2O_3$ content of 0.46% by weight were obtained. The "intrinsic viscosity" in decalin at 135° C., measured in accordance with DINISO 1628, was 9.86 dl/g.

EXAMPLE 2

After the polymerization had been carried out analogously to Example 1 (but with a polymerization time of 120 minutes) with the polymerization parameters given in Table 1, 2500 g of ethanol, preheated to 50° C., were metered into the reactor under a nitrogen prepressure of 40 bar at a speed of rotation of the stirrer of 200 revolutions/minute in the course of 2 minutes. After the speed of rotation of the stirrer had been increased to 400 revolutions/minute for 2 minutes, the reactor jacket was thermostatically controlled at 60° C. and the propene which had not been consumed was flashed off at 100 revolutions/minute in the course of 15 minutes. The ethanol slurry which remained was readily stirrable and could be discharged via the 1-inch ball valve in the base of the reactor.

The reactor wall, the stirrer and the thermocouple sheaths are largely free from polymer. After addition of 0.3% by weight of stabilizers analogously to Example 1, filtration of the elastomeric polypropylene and drying in vacuo at 50° C., 2.16 kg of a powdery/crumbly, non-tacky elastomeric polypropylene which was suitable for metering into processing machines were obtained.

EXAMPLE 3

After three propene/vacuum flushing cycles, propene was injected at 15° C., up to 1 bar, into a 5 l double-walled reactor which had been heated thoroughly at 160° C. under 0.1 mbar and had a Teflon-coated wall-flush stirrer, a thermostat and temperature, speed of rotation and torque measurement. After the stirrer had been raised to 500 revolutions/minute, a neophylzirconium aluminate catalyst supported on $Al_2O_3$ (TNZ/$Al_2O_3$) analogous to Example A (Zr content 1.71% by weight, $Al_2O_3$ content 94.30% by weight) was flushed in with 2.16 kg of liquid propene (about 20° C.). The propene temperature was then increased to 60° C. in the course of 10 minutes and this temperature was maintained for 120 minutes from addition of the catalyst. 0.7 kg of ethyl acetate was then metered into the reactor with a nitrogen prepressure of 40 bar in the course of 2 minutes and the excess propene was partly flashed off. Further ethyl acetate was subsequently metered into the reactor in several portions up to a final consumption of 1.2 kg, further propene in each case being flashed off.

The polymer slurry was readily stirrable and could be discharged from the reactor without problems via the bottom valve. The reactor wall and stirrer were covered with a thin layer of polymer, but this could easily be removed. The resulting product was crumbly and showed a low tendency to agglomerate.

EXAMPLE 4

The procedure followed was analogous to Example 1, but the polymerization, precipitation and flashing parameters according to Table 1 were used, the polymerization time was 120 minutes and the catalyst prepared analogously to Example A had a Zr content of 1.68% and an $Al_2O_3$ content of 92.63%.

The resulting ELPP/methanol slurry was readily stirrable and could easily be discharged via the bottom outlet valve of the reactor. The reactor wall, stirrer and thermocouple sheaths were largely free from polymer. After filtration of the elastomeric polypropylene and drying in vacuo at 50° C., a powdery/crumbly, non-tacky elastomeric polypropylene which was suitable for metering into processing machines was obtained.

EXAMPLE 5

The polymerization was carried out analogously to Example 3, but with the polymerization parameters given in Table 1. The Zr content of the catalyst was 1.64% and the $Al_2O_3$ content was 93.42%. For the precipitation, the ELPP-propene slurry was cooled in the reactor at a speed of rotation of the stirrer of 200 revolutions/minute by lowering the heat transfer medium temperature in the reactor jacket to 20° C. with cooling water. After 38 bar of $CO_2$ had been injected, some of the propene and some of the $CO_2$ which had been topped up several times was flashed off until a temperature of −5° C. was reached, in order to liquefy the $CO_2$ without exceeding the maximum pressure of 40 bar permitted for the reactor. At this temperature, $CO_2$ was injected into the reactor several times to a total pressure of 38 bar, so that liquid $CO_2$ was present, and a propene/$CO_2$ mixture was flashed off to maintain the temperature range of −5° to 0° C. This repeated injection was carried out until 3 kg of $CO_2$ had been consumed, after which the slurry was readily stirrable. Thereafter, the reactor was let down and the elastomeric polypropylene was present to the greatest extent in a crumbly/granule-like, non-tacky form. The reactor wall and the stirrer sometimes showed a slight film of polymer, depending on the local flow circumstances.

EXAMPLE 6

The procedure followed was analogous to Example 1, but with the polymerization, precipitation and flashing parameters according to Table 1 and a polymerization time of 120 minutes. The ELPP slurry obtained after the precipitation was free-flowing and readily stirrable. After filtration and drying, a non-agglomerated, powdery-crumbly ELPP was obtained.

EXAMPLE 7

After three propene/vacuum flushing cycles, a 20 l double-walled reactor which had been heated thoroughly at 160° C. under 0.1 mbar and had a surface-polished wall-flush stirrer, a thermostat jacket and temperature, speed of rotation and torque measurement was filled with 6.2 kg of propene and 2.25 Nl of $H_2$ at 25° C. After the stirrer had been raised to 400 revolutions/minute, 6.27 g of the TNZ-$Al_2O_3$ catalyst according to Example A (Zr content 1.71%, $Al_2O_3$ content 94.3%) were flushed in with 400 g of liquid propene (about 20° C.), and the speed of rotation was reduced to 260 revolutions/minute after 2 minutes. The propene temperature was then increased to 60° C. in the course of 10 minutes and this temperature was maintained for 120 minutes from addition of the catalyst.

The speed of rotation of the stirrer was then lowered to 200 revolutions/minute and 2500 g of acetone, preheated to about 40° C., were introduced into the reactor in the course of 1.5 minutes by means of an increased nitrogen pressure. After the speed of rotation of the stirrer had been increased to 400 revolutions/minute for 2 minutes and then lowered to 100 revolutions/minute, the reactor jacket was temperature-controlled at 40° C. and the propene which had not been consumed was flashed off in the course of 20 minutes. The ELPP-acetone slurry which remained was readily stirrable and could be discharged via the 1-inch bottom outlet of the reactor.

The reactor wall and stirrer were largely free from polymer. To stabilize the ELPP, a corresponding amount of Ionol® (Shell) and Irgafos® PEPQ (Ciba-Geigy) in a weight ratio of 2:1, which corresponded to about 0.3% by weight in the dried polymer, was added to the acetone slurry. After filtration of the elastomeric polypropylene and drying in a stream of nitrogen at 50° C., a pulverulent, free-flowing elastomeric polypropylene which was particularly suitable for conveying and metering into processing machines was obtained.

EXAMPLE 8

After three propene/vacuum flushing cycles, a 20 l double-walled reactor which had been heated thoroughly at 160° C. under 0.1 mbar and had a surface-polished wall-flush stirrer, a thermostatically controlled jacket and temperature, speed of rotation and torque measurement was filled with 7.30 kg of propene at 25° C. After the stirrer had been raised to 400 revolutions/minute, 11.12 g of the catalyst prepared analogously to Example A (Zr content 1.64%, $Al_2O_3$ content 93.42%) were flushed in with 300 g of liquid propene (about 20° C.), and the speed of rotation was reduced to 250 revolutions/minute after 2 minutes. The propene temperature was then increased to 60° C. in the course of about 10 minutes and this temperature was maintained for 60 minutes from addition of the catalyst. From the 15th minute, the reactor pressure was brought to and kept at 23.7 bar by metering in ethene, the total amount of ethene metered in up to the 60th minute being 360 g. The speed of rotation of the stirrer was then lowered to 200 revolutions/minute and 2500 g of acetone, preheated to about 25° C., were introduced into the reactor in the course of 2 minutes by means of increased nitrogen pressure. The propene which had not been consumed was then flashed off in the course of 20 minutes at a speed of rotation of 100 revolutions/minute. The ELPP (elastomeric polypropylene)-acetone slurry which remained was stirrable and could be discharged via the 1-inch bottom outlet of the reactor. For stabilization of the ELPP, a corresponding amount of Ionol® (Shell) and Irgafos® PEPQ (Ciba-Geigy) in a weight ratio of 2:1, which corresponded to about 0.3% by weight in the dried polymer, was added to the acetone slurry.

The reactor wall and stirrer were largely free from polymer. After drying in a stream of air and in vacuo at 50° C., 3.13 kg of a powdery/crumbly, non-tacky ELPP having a balanced Zr content of 58 ppm and an $Al_2O_3$ content of 0.33% by weight were obtained.

TABLE 1

| Example | Reactor (l) | Propene (kg) | Metering of catalyst (g) | (revolutions/minute) | Polymerization (°C.) |
|---|---|---|---|---|---|
| 1 | 20 | 7.6 | 11.06 | 400 | 60 |
| 2 | 20 | 7.6 | 11.34 | 290 | 60 |
| 3 | 5 | 2.16 | 3.0 | 500 | 60 |
| 4 | 20 | 7.6 | 10.82 | 400 | 60 |
| 5 | 5 | 1.53 | 2.5 | 687 | 60 |
| 6 | 20 | 7.6 | 6.02 | 400 | 70 |
| 7 | 20 | 6.6 | 6.27 | 400 | 60 |
| 8 | 20 | 7.6 | 11.12 | 400 | 60 |

| Example | Solvent* (kg) | Precipitation (°C.) | (revolutions/minute) | Flashing (°C.) | ELPP (kg) | % r (ppm) | $Al_2O_3$ (%) |
|---|---|---|---|---|---|---|---|
| 1 | 2.5 Ac | 50 | 200 | 60–55 | 2.21 | 83 | 0.46 |
| 2 | 2.5 Et | 50 | 200 | 50–60 | 2.16 | 87 | 0.48 |
| 3 | 1.2 EA | 23 | 467 | 45–35 | 0.56 | 92 | 0.51 |
| 4 | 1.7 Me | 50 | 200 | 60–46 | 1.93 | 94 | 0.52 |

TABLE 1-continued

| 5 | 3 | CO$_2$ | below 0 | 200 | −5–0 | 0.39 | 105 | 0.60 |
| 6 | 2.5 | Ac | 50 | 200 | 65–22 | 1.45 | 69 | 0.38 |
| 7 | 2.5 | Ac | 40 | 200 | 40–35 | 1.34 | 80 | 0.44 |
| 8 | 1 | Ac | 25 | 200 | 50–25 | 3.13 | 58 | 0.33 |

*Ac Acetone
Et Ethanol
EA Ethyl acetate
Me Methanol

What we claim is:

1. Process for the preparation of elastomeric, non-agglomerated, particulate polypropylenes with a stereoregular block arrangement in the chain structure by polymerization of propylene, with or without other olefins as comonomers, wherein liquid propylene is employed as the polymerization medium, and, in the next step after the polymerization, a polar solvent of which the polar term "delta p" of the solubility parameter according to Hansen is greater than 5 and the total solubility parameter "delta" is less than 30, or CO$_2$ is added to the polymerization mixture in an amount which is at least as high as the amount of the polypropylenes formed, whereupon the polypropylenes formed are precipitated and then isolated.

2. Process for the preparation of elastomeric polypropylenes according to claim 1, wherein "delta p" is greater than 8 and "delta" is less than 30.

3. Process for the preparation of elastomeric polypropylenes according to claim 1, wherein acetone is used as the polar solvent.

4. Process for the preparation of elastomeric polypropylenes according to claim 1, wherein methanol or ethanol is used as the polar solvent.

5. Process for the preparation of elastomeric polypropylenes according to claim 1, wherein, after the polymerization, the polypropylenes formed are precipitated with CO$_2$.

6. Process for the preparation of elastomeric polypropylenes according to claim 1, wherein ethylene is employed as a comonomer.

* * * * *